United States Patent
Jo

(10) Patent No.: US 11,486,456 B2
(45) Date of Patent: Nov. 1, 2022

(54) PARKING BRAKE APPARATUS

(71) Applicant: HYUNDAI MOBIS CO., LTD., Seoul (KR)

(72) Inventor: Chi Hoon Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 40 days.

(21) Appl. No.: 16/786,823

(22) Filed: Feb. 10, 2020

(65) Prior Publication Data

US 2020/0263749 A1 Aug. 20, 2020

(30) Foreign Application Priority Data

Feb. 15, 2019 (KR) .................. 10-2019-0017672

(51) Int. Cl.
| | |
|---|---|
| *F16D 51/00* | (2006.01) |
| *F16D 65/18* | (2006.01) |
| *F16D 55/02* | (2006.01) |
| *B60T 1/02* | (2006.01) |
| *F16D 65/56* | (2006.01) |
| *F16D 125/52* | (2012.01) |

(Continued)

(52) U.S. Cl.
CPC .............. *F16D 65/183* (2013.01); *B60T 1/02* (2013.01); *F16D 55/02* (2013.01); *F16D 65/567* (2013.01); *F16D 2121/24* (2013.01); *F16D 2125/40* (2013.01); *F16D 2125/52* (2013.01)

(58) Field of Classification Search
CPC .......... F16D 51/12; F16D 51/16; F16D 51/18; F16D 51/20; F16D 51/22; F16D 65/561; F16D 65/562; F16D 2121/24; F16D 2125/40

See application file for complete search history.

(56) References Cited

U.S. PATENT DOCUMENTS 3,983,975 A * 10/1976 Wright .................. F16D 65/567
188/71.9
8,091,689 B2 * 1/2012 Tristano .................. F16D 65/18
188/72.6

(Continued)

FOREIGN PATENT DOCUMENTS

| CN | 101317023 A | 12/2008 |
|---|---|---|
| CN | 206812987 U | 12/2017 |

(Continued)

OTHER PUBLICATIONS

Machine translation of DE 10 2006 009 089 (Year: 2021).*
Office Action dated Apr. 26, 2021 in corresponding Chinese Patent Application No. 202010086888.0.

*Primary Examiner* — Nicholas J Lane

(74) *Attorney, Agent, or Firm* — NovoTechIP International PLLC

(57) ABSTRACT

A parking brake apparatus may include: a driving part; a driving gear rotatably connected to the driving part; a gear shaft engaged with the driving gear so as to be rotated by the driving gear; a pair of pistons disposed on both sides of the gear shaft and connected to brake shoes, respectively; a pair of nuts disposed in the respective pistons, and screwed to the gear shaft; an elastic member installed between the piston and the nut so as to pressure the nut toward the brake shoe; a holder installed in the piston so as to support the elastic member; and a constraint ring installed in the piston so as to constrain the holder.

8 Claims, 3 Drawing Sheets

(51) Int. Cl.
*F16D 121/24* (2012.01)
*F16D 125/40* (2012.01)

(56) References Cited

U.S. PATENT DOCUMENTS

| | | | | |
|---|---|---|---|---|
| 2005/0252736 | A1* | 11/2005 | Leiter | B60T 11/046 |
| | | | | 188/73.1 |
| 2007/0151818 | A1* | 7/2007 | Linhoff | F16D 51/48 |
| | | | | 188/326 |
| 2010/0096224 | A1* | 4/2010 | Kim | F16D 51/48 |
| | | | | 188/74 |
| 2011/0308898 | A1* | 12/2011 | Shiraki | F16D 65/567 |
| | | | | 188/72.4 |
| 2017/0023079 | A1* | 1/2017 | DeMorais | F16D 55/22 |
| 2018/0106316 | A1* | 4/2018 | Choi | B60T 13/741 |
| 2021/0079969 | A1* | 3/2021 | Jo | B60T 13/741 |
| 2021/0123490 | A1* | 4/2021 | Jo | B60T 13/746 |

FOREIGN PATENT DOCUMENTS

| | | | | |
|---|---|---|---|---|
| DE | 102006009089 A1 * | 8/2007 | | F16D 51/18 |
| KR | 10-2006-0134444 A | 12/2006 | | |

* cited by examiner

PARKING BRAKE APPARATUS

CROSS-REFERENCE TO RELATED APPLICATION

The present application claims priority under 35 U.S.C. § 119(a) to Korean Patent Application No. 10-2019-0017672 filed on Feb. 15, 2019 in the Korean Intellectual Property Office, which is incorporated herein by reference in its entirety.

BACKGROUND

1. Technical Field

Embodiments of the present disclosure relate to a parking brake apparatus, and more particularly, to a parking brake apparatus which can improve assembling efficiency, and control one elastic member to compensate for a stroke loss even when the other elastic member is damaged.

2. Related Art

In general, an EPB (Electronic Parking Brake) refers to an apparatus that operates a parking brake using a driving motor's force without using a driver's force, such that a parked vehicle is not moved. That is, when the motor of the EPB is driven to rotate a worm gear, a worm wheel gear engaged with the worm gear is rotated to move a piston. Then, the parking brake is operated or released.

The piston has a nut installed therein, and an elastic member is installed between the nut and the piston. When a brake shoe is rotated, a stroke loss may occur to isolate the piston and the brake shoe from each other. When the stroke loss occurs, the elastic member may push the piston toward the brake shoe, thereby compensating for the stroke loss.

In the related art, however, when the elastic member is damaged, the piston cannot be elastically pressed toward the brake shoe. Thus, the stroke loss cannot be compensated for. Furthermore, since the piston, the elastic member, a bolt screw and the worm gear are separately installed, the assembling efficiency of the parking brake apparatus may be degraded. Therefore, there is a need for a device capable of solving the problem.

The related art of the present disclosure is disclosed in Korean Patent Application Laid-Open No. 2006-0134444 published on Dec. 28, 2006 and entitled "Parking Brake Apparatus of Disk Brake".

SUMMARY

Various embodiments are directed to a parking brake apparatus which can improve assembling efficiency, and control one elastic member to compensate for a stroke loss even when the other elastic member is damaged.

In an embodiment, a parking brake apparatus may include: a driving part; a driving gear rotatably connected to the driving part; a gear shaft engaged with the driving gear so as to be rotated by the driving gear; a pair of pistons disposed on both sides of the gear shaft and connected to brake shoes, respectively; a pair of nuts disposed in the respective pistons, and screwed to the gear shaft; an elastic member installed between the piston and the nut so as to pressure the nut toward the brake shoe; a holder installed in the piston so as to support the elastic member; and a constraint ring installed in the piston so as to constrain the holder.

The holder may include: a first holder ring installed in the piston so as to support the elastic member; and a second holder ring stacked on the first holder ring, configured to constrain the nut, and constrained by the constraint ring.

The second holder ring may have a second protrusion part to constrain the first holder ring, and the first holder ring may be locked to and constrained by the constraint ring.

The second holder ring may have a holder screw part formed on the inner surface thereof, and the nut may have an outer screw part formed on the outer surface thereof so as to be screwed to the holder screw part.

The piston may have a constraint groove formed on the inner surface thereof, such that the constraint ring is locked to and constrained by the constraint groove.

The elastic member may include a plurality of disk springs stacked in the piston.

The piston may include: a piston body part having a containing space part in which the nut and the elastic member are contained and an anti-rotation part configured to communicate with the containing space part and prevent rotation of the nut; and a piston pressing part extended from the piston body part so as to be connected to the brake shoe.

The anti-rotation part may be formed in a polygonal shape, and the nut may have a polygonal flange part formed on the outer surface thereof so as to be constrained by the anti-rotation part.

The driving part may include a motor and a decelerator, and a driving force of the motor may be transferred to the driving gear through the decelerator.

The gear shaft may include: a worm wheel engaged with the driving gear; and a pair of screws extended axially from both sides of the worm wheel, respectively, and having a screw thread screwed to the nut.

The screw threads of both of the screws may be formed in the opposite direction, the worm wheel and the screws may be rotated as the driving gear is rotated, and the nuts and the pistons may be rotated in the axial direction of the gear shaft as the screws are rotated.

In accordance with the embodiment of the present disclosure, since the pistons, the nuts and the elastic members are assembled into one assembly, the assembling efficiency of the parking brake apparatus can be improved, and the assembling time can be shorted.

Furthermore, since the constraint ring is fitted into the piston and the holder and the elastic member are fixed so as not to be separated, the assembling efficiency of the parking brake apparatus can be improved.

Furthermore, since the pair of elastic members are installed on both sides of the gear shaft and the pistons are elastically supported by the respective elastic members, an elastic force of one elastic member may be applied to both of the pistons, even though the other elastic member is damaged. Therefore, although the other elastic member is damaged, the elastic force of the one elastic member can be applied to both of the brake shoes, thereby compensating for stroke losses of the pistons.

DETAILED DESCRIPTION

Hereinafter, a parking brake apparatus will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
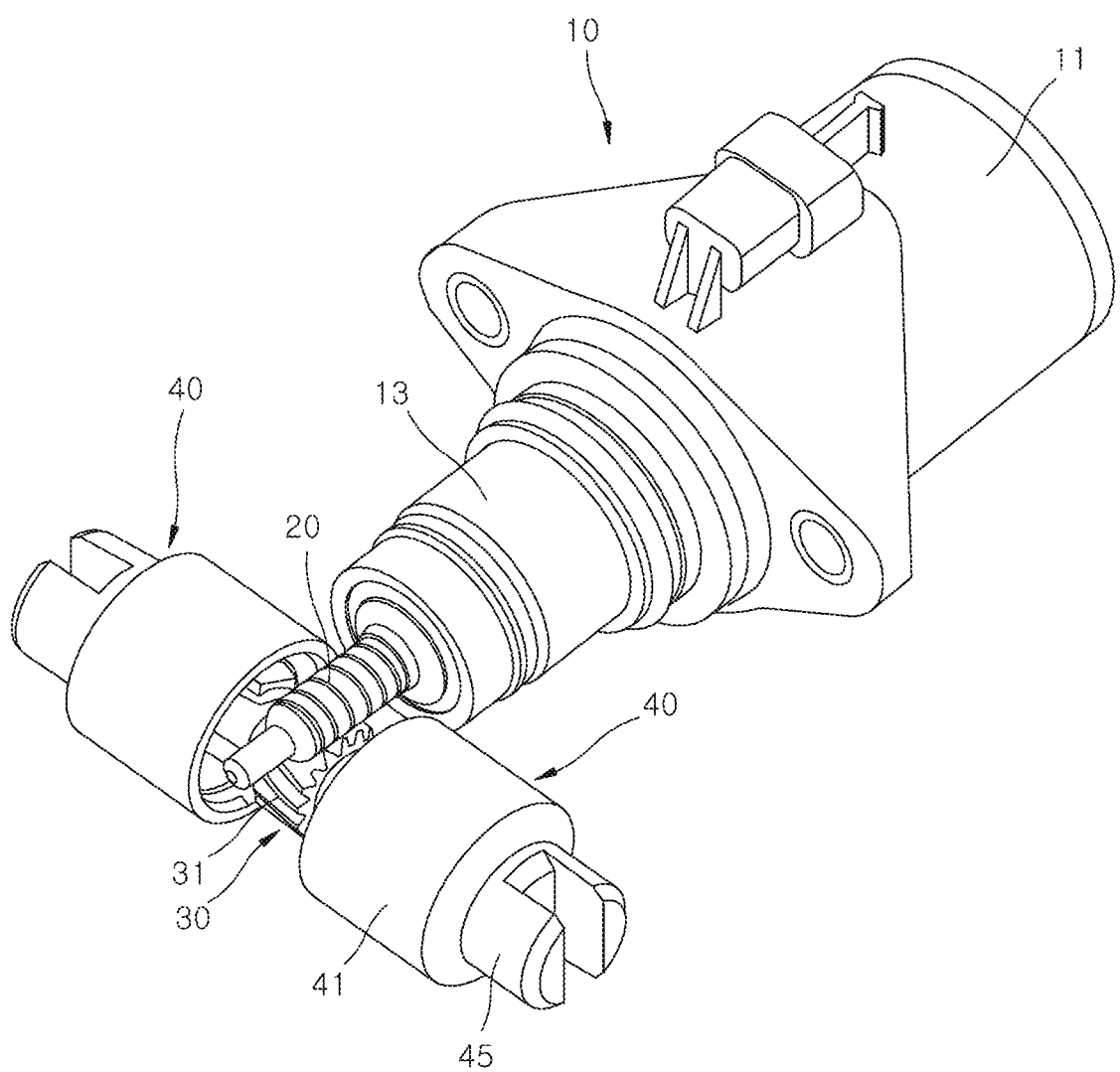
FIG. 1 is a perspective view illustrating a parking brake apparatus in accordance with an embodiment of the present disclosure.
Figure 2:
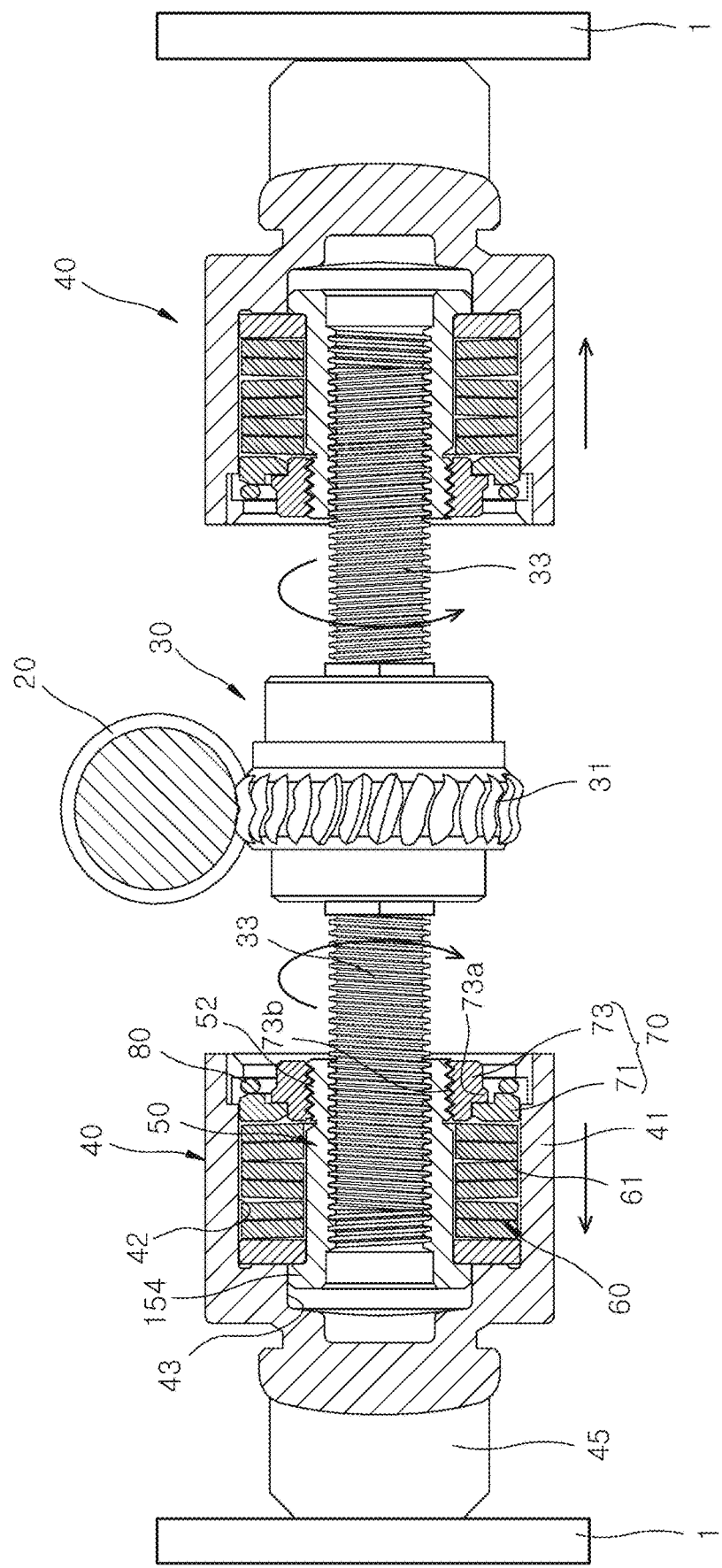
FIG. 2 is a cross-sectional view illustrating the parking brake apparatus in accordance with the embodiment of the present disclosure.
Figure 3:
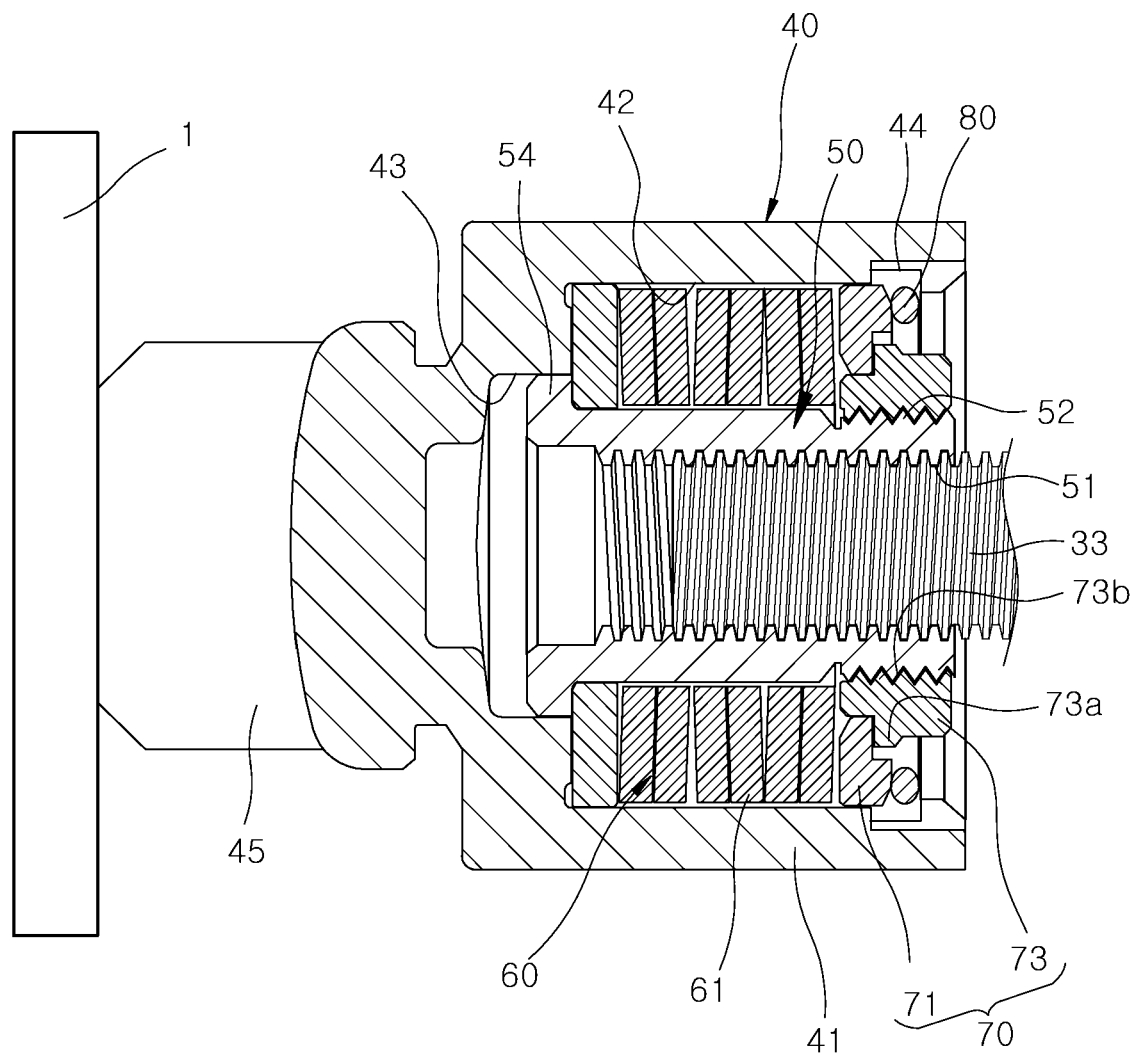
FIG. 3 is a cross-sectional view illustrating the internal structure of a piston in the parking brake apparatus in accordance with the embodiment of the present disclosure.

FIG. 1 is a perspective view illustrating a parking brake apparatus in accordance with an embodiment of the present disclosure, FIG. 2 is a cross-sectional view illustrating the parking brake apparatus in accordance with the embodiment of the present disclosure, and FIG. 3 is a cross-sectional view illustrating the internal structure of a piston in the parking brake apparatus in accordance with the embodiment of the present disclosure.

Referring to FIGS. 1 to 3, the parking brake apparatus in accordance with the embodiment of the present disclosure includes a driving part 10, a driving gear 20, a gear shaft 30, a pair of pistons 40, a pair of nuts 50, a pair of elastic members 60, a pair of holders 70 and a pair of constraint rings 80.

The driving part 10 includes a motor 11 and a decelerator 13. The driving force of the motor 11 is transferred to the driving gear 20 by the decelerator 13.

The driving gear 20 is rotatably connected to the driving part 10. At this time, the driving gear 20 is axially coupled to an output gear (not illustrated) of the decelerator 13. A worm gear may be applied as the driving gear 20.

The gear shaft 30 is engaged with the driving gear 20 so as to be rotated by the driving gear 20. The gear shaft 30 includes a worm wheel 31 engaged with the driving gear 20 and a pair of screws 33 extended axially from both sides of the worm wheel 31 and coupled to the respective nuts 50. Both of the screws 33 have screw threads formed in the opposite direction. As the driving gear 20 is rotated, the worm wheels 31 and the screws 33 are rotated. As the screws 33 are rotated, the nuts 50 and the pistons 40 are rotated in the axial direction of the gear shaft 30. At this time, the pair of pistons 40 are moved to both sides of the gear shaft 30 at the same time, or moved toward the center of the gear shaft 30 at the same time. Therefore, the pair of pistons 40 are moved away from each other or close to each other.

The pistons 40 are disposed on both sides of the gear shaft 30, and connected to a pair of brake shoes 1, respectively. As the pistons 40 pressurize the brake shoes 1, driving wheels (not illustrated) are constrained from rotating. As the pistons 40 are moved to the opposite sides of the brake shoes 1, the driving wheels are released.

Each of the pistons 40 includes a piston body part 41 and a piston pressing part 45. The piston body part 41 includes a containing space part 42 in which the nut 50 and the elastic member 60 are contained, and an anti-rotation part 43 which communicates with the containing space part 42 and prevents the rotation of the nut 50. The anti-rotation part 43 has a smaller inner diameter than that of the containing space part 42. Since the piston body part 41 has the anti-rotation part 43 to prevent the rotation of the nut 50, the rotation of the gear shaft 30 is converted into a linear motion of the nut 50.

The anti-rotation part 43 is formed in a polygonal shape, and the nut 50 has a polygonal flange part 54 formed on the outer surface thereof so as to be constrained by the anti-rotation part 43. Since the polygonal flange part 54 is constrained by the anti-rotation part 43, the nut 50 is not rotated but moved straight, when the gear shaft 30 is rotated.

The nut 50 is disposed in each of the pistons 40, and screwed to the gear shaft 30. The nut 50 has a nut screw part 51 formed on the inner surface thereof. The nut screw part 51 is screwed to the screw 33 of the gear shaft 30. When the gear shaft 30 is rotated, the nut 50 and the piston 40 are moved together in the axial direction of the gear shaft 30.

The elastic member 60 is installed between the piston 40 and the nut 50 so as to pressurize the nut 50 toward the brake shoe 1. The elastic member 60 includes a plurality of disk springs 61 stacked in the piston 40. The elastic member 60 elastically pressurizes the piston 40 toward the brake shoe 1. Since the elastic member 60 elastically pressurizes the brake shoe 1, the elastic member 60 pushes the piston 40 toward the brake shoe 1 when a stroke loss occurs to isolate the piston 40 from the brake shoe 1. Therefore, the stroke loss of the piston 40 may be compensated for.

Since the elastic members 60 are installed on both sides of the gear shaft 30, respectively, and the pistons 40 are elastically supported by the elastic members 60, respectively, an elastic force of one elastic member 60 may be applied to both of the pistons 40, even though the other elastic member 60 is damaged. Therefore, although the other elastic member 60 is damaged, the one elastic member 60 may compensate for stroke losses which occur in both of the brake shoes 1.

The holder 70 is installed in the piston 40 so as to support an end of the elastic member 60. Since the holder 70 is installed in the piston 40 so as to support the end of the elastic member 60, the holder 70 may prevent the elastic member 60 from being separated to the outside of the piston 40.

The holder 70 includes a first holder ring 71 and a second holder ring 73. The first holder ring 71 is installed in the piston 40 so as to support the elastic member 60. The first holder ring 71 is formed in a ring shape as a whole. The second holder ring 73 is stacked on the first holder ring 71, and constrains the nut 50 while constrained by the constraint ring 80. Since the second holder ring 73 constrains the nut 50 and the constraint ring 80 constrains the second holder ring 73, the elastic member 60 and the nut 50 may be prevented from being separated from the piston 40. Furthermore, since the constraint ring 80 is installed in the piston 40 so as to constrain the second holder ring 73, the assembling efficiency of the parking brake apparatus can be improved, and the assembling time can be shortened.

The constraint ring 80 is installed in the piston 40 so as to constrain the holder 70. The constraint ring 80 is partially cut and formed in a C-shape. When the constraint ring 80 is fitted into the piston 40, the constraint ring 80 is expanded to the outside by its restoring force and fixed to the piston 40. Therefore, when the constraint ring 80 is fitted into the piston 40, the holder 70 and the elastic member 60 are fixed so as not to be separated, which makes it possible to improve the assembling efficiency of the parking brake apparatus.

The second holder ring 73 has a second protrusion part 73a to constrain the first holder ring 71, and the first holder ring 71 is locked to and constrained by the constraint ring 80. Since the first holder ring 71 is locked to and constrained by the second protrusion part 73 *a* of the second holder ring 73 and the constraint ring 80, the elastic member 60 may be prevented from being separated from the piston 40.

The second holder ring 73 has a holder screw part 73 *b* formed on the inner surface thereof, and the nut 50 has an outer screw part 52 formed on the outer surface thereof so as to be screwed to the holder screw part 73 *b*. Since the second holder ring 73 is screwed to the outer surface of the nut 50, the nut 50 is constrained from being separated from the piston 40.

The piston 40 has a constraint groove 44 formed on the inner surface thereof such that the constraint ring 80 is locked to and constrained by the constraint groove 44. The constraint groove 44 is formed in a ring shape along the inner surface of the piston 40. Since the constraint ring 80 is locked to and constrained by the constraint groove 44, the first holder ring 71 and the elastic member 60 may be prevented from being separated from the piston 40.

In the present disclosure, since the pistons 40, the nuts 50 and the elastic members 60 may be assembled and formed as one assembly, the assembling efficiency of the parking brake apparatus can be improved, and the assembling time can be shortened.

The operation of the parking brake apparatus in accordance with the embodiment of the present invention, which has the above-described configuration, will be described.

When a vehicle is parked, the driving part 10 is driven. At this time, the motor 11 is driven, and the rotation speed of the motor 11 is reduced by the decelerator 13. As the decelerator 13 is driven, the driving gear 20 is rotated in one direction. As the driving gear 20 is engaged and rotated with the worm wheel 31 of the gear shaft 30, the pair of nuts 50 and the pair of pistons 40 are moved toward the respective brake shoes 1. As the pistons 40 pressurize the brake shoes 1, the driving wheels are constrained.

Since the pair of elastic members 60 are installed on both sides of the gear shaft 30 and the pistons 40 are elastically supported by the respective elastic members 60, an elastic force of one elastic member 60 may be applied to both of the pistons 40, even though the other elastic member 60 is damaged. Therefore, although the other elastic member 60 is damaged, the elastic force of the one elastic member 60 can be applied to both of the brake shoes 1, thereby compensating for stroke losses of the pistons 40.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A parking brake apparatus comprising:
    a driving part;
    a driving gear rotatably connected to the driving part;
    a gear shaft engaged with the driving gear and configured to rotate in response to rotation of the driving gear;
    a piston located between the gear shaft and a brake shoe and having a first end adjoining the brake shoe and a second end having an opening exposing an inner space of the piston;
    a nut located in the inner space of the piston and screwed to the gear shaft;
    an elastic member located between the piston and the nut and configured to press the nut toward the brake shoe;
    a holder located entirely in the inner space of the piston and configured to support the elastic member, the holder comprising:
        a first holder ring configured to press the elastic member toward the brake shoe and having a first main surface in contact with and pressing the elastic member and a second main surface facing opposite to the first main surface, the second main surface having (1) an inner portion surrounding an inner circumferential edge of the first holder ring and (2) an outer portion surrounding and protruding from the inner portion; and
        a second holder ring positioned at the second end of the piston configured to press the first holder ring toward the elastic member, the second holder ring having (1) an inner surface configured to engage the second end of the nut and (2) an outer surface having a protrusion part in contact with and pressing the inner portion of the second surface of the first holder ring; and
    a constraint ring located entirely in the inner space of the piston and configured to constrain the first holder ring, the constraint ring surrounding the second holder ring of the holder at the second end of the piston and in contact with and pressing the outer portion of the second surface of the first holder ring,
    wherein the piston has a constraint groove positioned on an inner surface of the piston and extending along and adjacent to the opening of the piston,
    wherein a diameter of the constraint groove is greater than that of the opening of the piston,
    wherein a diameter of an outer circumference of the constraint ring is greater than that of the opening of the piston, and
    wherein the constraint ring is partially cut to allow the constraint ring to compress when passing through the opening of the piston and then expand and fit into the constraint groove after passing through the opening of the piston.

2. The parking brake apparatus of claim 1, wherein:
    the second holder ring has a holder screw part formed on the inner surface thereof, and
    the nut has an outer screw part formed on an outer surface thereof and configured to engage the holder screw part of the second holder ring.

3. The parking brake apparatus of claim 1, wherein the elastic member comprises a plurality of disk springs stacked in the inner space of the piston.

4. The parking brake apparatus of claim 1, wherein the piston comprises:
    a piston body part having the inner space containing the nut and elastic member and an anti-rotation part configured to prevent rotation of the nut; and
    a piston pressing part extended from the piston body part and connected to the brake shoe.

5. The parking brake apparatus of claim 4, wherein:
    the anti-rotation part has a polygonal shape, and
    the nut has a polygonal flange part formed on an outer surface thereof and configured to be constrained by the anti-rotation part.

6. The parking brake apparatus of claim 1, wherein the driving part comprises a motor and a decelerator configured to transfer a driving force of the motor to the driving gear.

7. The parking brake apparatus of claim 1, wherein the gear shaft comprises:
    a worm wheel engaged with the driving gear; and a screw extending from the worm wheel and having a screw thread screwed to the nut.

8. The parking brake apparatus of claim 7, wherein:
the worm wheel and screw are configured to rotate when the driving gear is rotated, and
the nut and piston are configured to move in an axial direction of the gear shaft when the screw is rotated.

\* \* \* \* \*